United States Patent
Dabous et al.

(10) Patent No.: US 9,583,148 B2
(45) Date of Patent: Feb. 28, 2017

(54) SYSTEMS AND METHODS FOR PROVIDING ELECTRONIC CUES FOR TIME-BASED MEDIA

(71) Applicant: IMAGEVIEW MEDIA INC., Toronto (CA)

(72) Inventors: Stephen Douglas Dabous, Pickering (CA); Thomas Christopher Ryder, Toronto (CA); David Cyril Moxley, Markham (CA)

(73) Assignee: IMAGEVIEW MEDIA INC., Toronto (CA)

( * ) Notice: Subject to any disclaimer, the term of this patent is extended or adjusted under 35 U.S.C. 154(b) by 14 days.

(21) Appl. No.: 14/391,623

(22) PCT Filed: Mar. 15, 2013

(86) PCT No.: PCT/CA2013/000233
§ 371 (c)(1),
(2) Date: Oct. 9, 2014

(87) PCT Pub. No.: WO2013/152420
PCT Pub. Date: Oct. 17, 2013

(65) Prior Publication Data
US 2015/0071601 A1    Mar. 12, 2015

Related U.S. Application Data

(60) Provisional application No. 61/621,741, filed on Apr. 9, 2012.

(51) Int. Cl.
*H04N 9/80* (2006.01)
*G11B 27/30* (2006.01)
(Continued)

(52) U.S. Cl.
CPC .......... *G11B 27/3036* (2013.01); *G06Q 30/02* (2013.01); *H04N 21/2547* (2013.01); *H04N 21/2668* (2013.01); *H04N 21/26241* (2013.01); *H04N 21/47217* (2013.01); *H04N 21/47815* (2013.01); *H04N 21/6125* (2013.01); *H04N 21/6175* (2013.01); *H04N 21/6543* (2013.01); *H04N 21/812* (2013.01)

(58) Field of Classification Search
USPC .................................................. 386/248–251
See application file for complete search history.

(56) References Cited

U.S. PATENT DOCUMENTS 7,979,877 B2    7/2011 Huber et al.
2002/0078446 A1    6/2002 Dakss et al.
(Continued)

OTHER PUBLICATIONS

Patent Cooperation Treaty, Written Opinion and International Search Report dated Jun. 21, 2013, issued on PCT Application No. PCT/CA2013/000233.

*Primary Examiner* — Nigar Chowdhury
(74) *Attorney, Agent, or Firm* — Sabeta IP

(57) ABSTRACT

Systems, methods, and devices for media electronic cues that involve determining a position of the media electronic within the display screen displaying time-based media and a time for displaying the media electronic based on the playback time of the media, its content, product placement data, and so on. The electronic cue may be a visual cue, and auditory cue, or a combination thereof.

20 Claims, 8 Drawing Sheets

(51) Int. Cl.
    *G06Q 30/02*      (2012.01)
    *H04N 21/2547*    (2011.01)
    *H04N 21/262*     (2011.01)
    *H04N 21/2668*    (2011.01)
    *H04N 21/472*     (2011.01)
    *H04N 21/478*     (2011.01)
    *H04N 21/61*      (2011.01)
    *H04N 21/6543*    (2011.01)
    *H04N 21/81*      (2011.01)

(56) References Cited

U.S. PATENT DOCUMENTS

| | | | |
|---|---|---|---|
| 2007/0260677 A1* | 11/2007 | DeMarco | H04N 21/4825 |
| | | | 709/203 |
| 2008/0307454 A1 | 12/2008 | Ahanger et al. | |
| 2011/0153396 A1* | 6/2011 | Marcuvitz | G06Q 20/02 |
| | | | 705/14.2 |
| 2011/0261258 A1 | 10/2011 | Ramachandran et al. | |
| 2013/0046641 A1* | 2/2013 | DeVree | G06Q 30/0277 |
| | | | 705/14.69 |
| 2014/0044407 A1* | 2/2014 | Kuznetsov | H04L 29/06027 |
| | | | 386/241 |

* cited by examiner

SYSTEMS AND METHODS FOR PROVIDING ELECTRONIC CUES FOR TIME-BASED MEDIA

FIELD

The described embodiments relate to time-based media, and in particular, systems and methods for generating and providing electronic cues for time-based media playing on a computing device.

INTRODUCTION

Electronic cues may trigger a signal or marker to prompt for user attention. Examples of electronic cues include a visual rendering within a display frame such as an advertisement, animation, and search box, as well as an auditory cue such as music, noise, and so on. As an illustrative example, an electronic cue may be an advertisement. Advertising is a significant revenue source for many media industries including for example television, film, and Internet video. Known advertisements or other electronic cues displayed concurrently within a media display frame may block the view of the displayed media or interrupt and suspend playback of the media in order to prompt for user attention. The value of an advertising campaign to an advertiser depends in part on how well the campaign is targeted to the appropriate audience and how many viewers are exposed to and act upon the advertisements. This may apply to other electronic cues, as its value depends in part on how well the electronic cue prompts for user attention, is targeted to the appropriate audience and how many viewers are exposed to and act upon the prompt. For example, displaying a coffee advertisement to a single adult may provide more value to the advertiser than displaying the same advertisement to a thousand young children. The value of a campaign may also depend in part on the timing of delivery for the advertisement and placement thereof. There is a need for an improved system for providing electronic cues, such as advertisement, which can better target audience members with improved timing and prompts.

SUMMARY

In a first aspect, embodiments described herein may provide a method for providing one or more electronic cues for time-based media on a display of a client device, the method comprising: assembling a first expandable electronic cue for display together with the media, wherein the first expandable electronic cue is associated with a first predetermined media timecode, wherein the first predetermined media timecode corresponds to a playtime of the media at playback; using a processor, determining a first display screen position for the first expandable electronic cue within a display frame of the media, wherein the first display screen position is based upon the first predetermined media timecode; and triggering display of the first expandable electronic cue at the first display screen position.

In accordance with some embodiments, the electronic cue may be an advertisement and the method may further comprise: receiving a plurality of ad campaign specifications; receiving a listing of product placement information for the media, wherein the listing identifies a product placement and a corresponding media timecode; maintaining a listing of available advertisements; generating a sublisting of available advertisements by matching the listing of product placement information to the listing of available advertisements and filtering based on the ad campaign specifications; selecting the first expandable advertisement from the sublisting of available advertisement as, wherein the first expandable advertisement is associated with the product placement; and setting the first predetermined media timecode to be the corresponding media timecode. Instead of a listing of product placements, in some embodiments there may be provided a listing of content items, each associated with content reference within the media at different times. The content may be a reference to an event, a person, a place, and so on. The electronic cue may be associated with the content referenced at the particular timecode the electronic cue is linked to.

In accordance with some embodiments, the expandable electronic cue may comprise an icon portion and a fly-out portion, the method further comprising hiding the fly-out portion until a pre-determined user interaction is detected In accordance with some embodiments, the method may further comprise detecting a user interaction and recording, in a memory, the detected user interaction in association the first expandable electronic cue.

In accordance with some embodiments, the method may further comprise triggering the display of the first expandable electronic cue at the predetermined media timecode at playback of the media.

In accordance with some embodiments, the method may further comprise: determining a position grid corresponding to a display of a timeline for the media, the position grid comprising a plurality of timeline positions corresponding to a plurality of video timecodes in the playback of the media; and determining the first display screen position for the first expandable electronic cue relative to the media based upon a timeline position of the plurality of timeline positions.

In accordance with some embodiments, the method may further comprise detecting the pre-determined user interaction and extending the fly-out portion of the first extendable electronic cue.

In accordance with some embodiments, the method may further comprise hiding the fly-out portion after a discontinuation of the user interaction is detected.

In accordance with some embodiments, the first display screen position may overlap the timeline position.

In accordance with some embodiments, the display size of the first expandable electronic cue may be in the range of about 1% and 10% of a display size of the media.

In accordance with some embodiments, the method may further comprise assembling a second expandable electronic cue for display together with the media, wherein the second expandable electronic cue is associated with a second predetermined media timecode, wherein the second predetermined media timecode corresponds to a playtime of the media at playback; using the processor, determining a second display screen position for the second expandable electronic cue relative to the media based upon the second predetermined media timecode; and triggering display of the second expandable electronic cue at the second display screen position.

In accordance with some embodiments, the first predetermined media timecode is earlier than the second predetermined media timecode.

In accordance with some embodiments, the method may further comprise displaying a timeline for the media, wherein the timeline comprises a plurality of timeline positions corresponding to a plurality of media timecodes for the media; and determining the first display screen position for the first expandable electronic cue relative to the media based upon a first timeline position corresponding to the first predetermined media timecode; determining the second display screen position for the second expandable electronic cue relative to the media based upon a second timeline position corresponding to the second predetermined media timecode.

In accordance with some embodiments, the method may further comprise receiving a plurality of user interactions corresponding to a plurality of users; recording in memory interaction metrics based on the plurality of user interactions, assembling the first expandable electronic cue based on the interaction metrics.

In accordance with some embodiments, the method may further comprise receiving user demographics, and assembling the first expandable electronic cue by matching the user demographics to the interaction metrics.

In accordance with some embodiments, user demographics may comprise location data and historical behavior data.

In another aspect, embodiments described herein may provide a computing system for providing electronic cues comprising a processor coupled to a computer readable memory comprising computer executable instructions that when executed by the processor cause the processor to: assemble a first expandable electronic cue for display together with the media, wherein the first expandable electronic cue is associated with a first predetermined media timecode, wherein the first predetermined media timecode corresponds to a playtime of the media at playback; determine a first display screen position for the first expandable electronic cue within a display frame of the media, wherein the first display screen position is based upon the first predetermined media timecode; and trigger display of the first expandable electronic cue at the first display screen position.

In accordance with some embodiments, the electronic cue may be an advertisement, and the processor may be further configured to: receive a plurality of ad campaign specifications; receive a listing of product placement information for the media, wherein the listing identifies a product placement and a corresponding media timecode; maintain a listing of available advertisements; generate a sublisting of available advertisements by matching the listing of product placement information to the listing of available advertisements and filtering based on the ad campaign specifications; select the first expandable advertisement from the sublisting of available advertisement, wherein the first expandable advertisement is associated with the product placement; and set the first predetermined media timecode to be the corresponding media timecode.

In another aspect, embodiments described herein may provide a client computing system comprising a processor coupled to a computer readable memory comprising computer executable instructions that when executed by the processor cause the processor to: receive a first expandable electronic cue for display together with the media, wherein the first expandable electronic cue is associated with a first predetermined media timecode, wherein the first predetermined media timecode corresponds to a playtime of the video at playback; receive a first display screen position for the first expandable electronic cue within a display frame of the media, wherein the first display screen position is based upon the first predetermined media timecode; display the first expandable electronic cue together with the video at the first predetermined media timecode, wherein the first expandable electronic cue is displayed at the first display screen position; and collect and transmit user demographic and behavior data based on the first expandable electronic cue.

In accordance with some embodiments, the processor may be further configured to: determine a position grid corresponding to a display of a timeline for the media, the position grid comprising a plurality of timeline positions corresponding to a plurality of video timecodes in the playback of the media; and determine the first display screen position for the first expandable electronic cue relative to the media based upon a timeline position of the plurality of timeline positions.

DRAWINGS

Embodiments will now be described in detail with reference to the drawings, in which.

Figure 1:
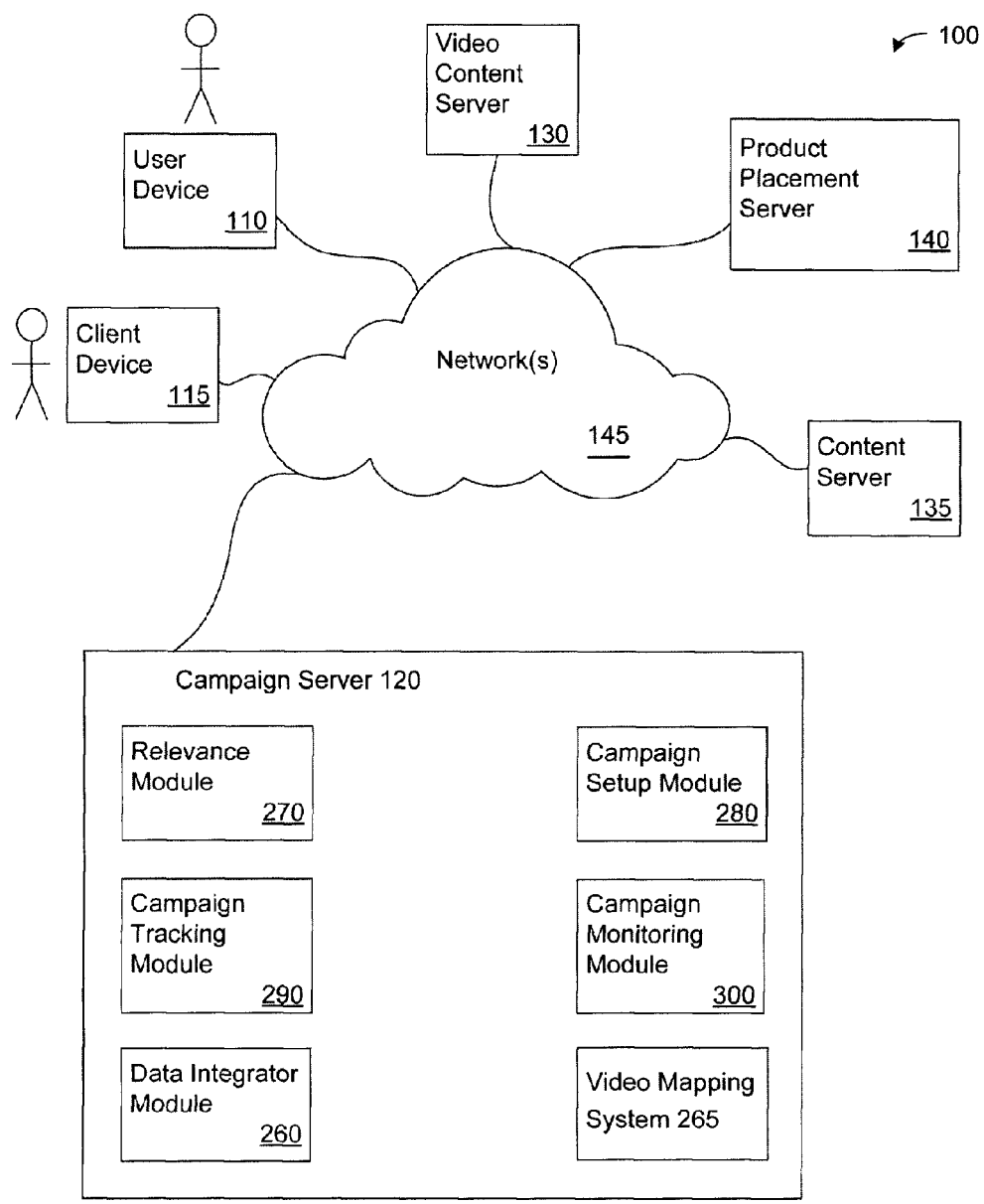
FIG. 1 is a block diagram showing an example of a system for providing electronic cues to a user device in accordance with embodiments described herein.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, gaming consoles, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Embodiments described herein relate to providing electronic cues during playback of time-based media. Time-based media may include multiple media frames, where each media frame is associated with a timecode corresponding to a playtime of the media frame at playback of the time-based media. Electronic cues may be provided at specific time-codes corresponding to media frames of the time-based media. Electronic cues may trigger a signal or marker to prompt for user attention. Examples of electronic cues include a visual rendering within a display screen displaying the media frame, such as an advertisement, animation, and search box. The visual rendering may include text, images, video, hyperlinks, embedded applications, search boxes, and so on. The electronic cue may provide information about content of the media, product, services, alerts, and so on. Electronic cues may also be auditory cues such as music, noise, speech, and so on. As an illustrative example, an electronic cue may be an advertisement. The advertisements may overlay on a video playing on a computing device, such as a web based device, network connected device, or IPTV, for example. The advertisement may be an electronic cue because when it suddenly displays within a video frame it may act as a prompt for user attention. Provision of the advertisements and other electronic cues within a display screen for playback of time-based media may be accomplished without invading the users viewing experience (time or space). Other systems and methods may obstruct the view of the media content or interrupt play with a pre-roll, mid-roll or post-roll. An advertisement may be a form of communication used to encourage, persuade or provide information to an audience, such as a commercial offering, link to additional content, paid and unpaid product promotional messages, political perspective, ideological statement, or other information. An advertisement may include text, images, audio, video, hyperlinks, embedded applications, and so on. An advertisement may provide information about product, services, content of the media, and so on. The embodiments described herein provide improved methods and systems for providing electronic cues that may be nonintrusive, minimally interrupting, minimally obstructive of viewer's experience, targeted, dynamic, interactive, relevant, and so on.

The systems and method described herein relate to providing electronic cues, such as advertisements, for simultaneous display with time-based media. Time-based media may include a variety of electronic media content such videos, videogames, slideshows, animations, and so on. The time-based media may include media frames each with corresponding timecodes for playback of the media. The media may include event triggers that may also be referred to as timecodes. For example, the media may be a video game with different music and video components linked to a timeline. The video game may also have involve different events, such as a player virtually meeting another character in the game, where that event may be in turn linked to a timecode when it occurs to trigger the display of an electronic cue. Examples may be described herein in relation to video, but other forms of media content may also be used.

The embodiments described herein may involve assembling a first expandable electronic cue for display together with the time-based media. The time-based media may include a plurality of media frames, where each media frame is associated with a timecode corresponding to a playtime of the media frame at playback of the time-based media. The expandable electronic cue is associated with a first predetermined media timecode, where the first predetermined media timecode corresponds to a timecode associated with a media frame of the plurality of media frames for the time-based media. A display screen position for the expandable electronic cue is determined, where the display screen position is located within a display frame of the media and is based upon the first predetermined media timecode. The embodiments described herein may involve triggering display of the expandable electronic cue at the first display screen position location.

Referring now to FIG. 1, there is shown an example of a system 100 for providing electronic cues to one or more user devices 110. System 100 is operable to connect to one or more user devices 110, one or more client devices 115, a campaign server 120, a video (media) content server 130, a (electronic cue and/or media) content server 135, a product placement server 140, and one or more networks 145. Video is a non-limiting example of time-based media and other forms of media content may also be used.

Figure 2:
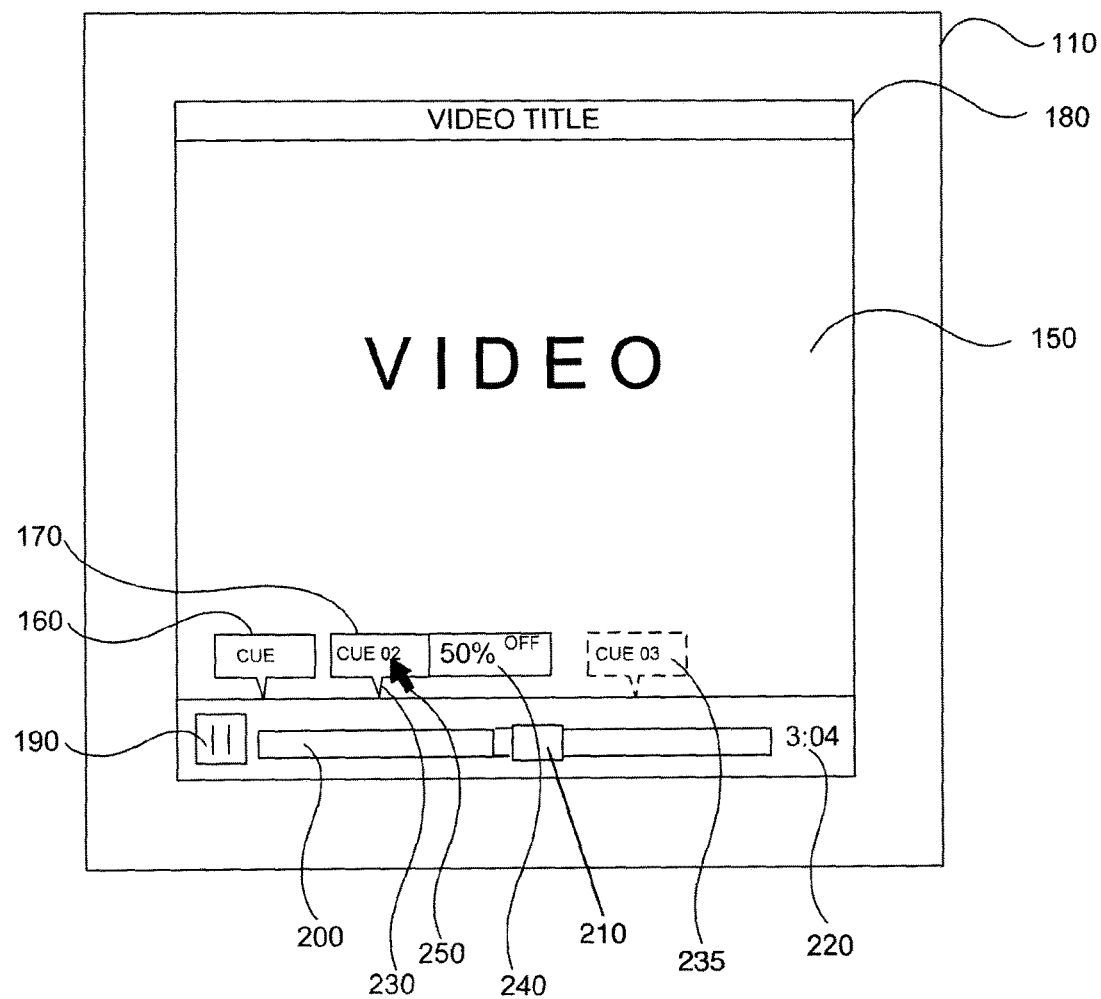
FIG. 2 shows an example of a user device displaying media and an electronic cue in accordance with embodiments described herein.

Referring now to FIG. 2, there is shown an example user device 110 display screen displaying a video 150 and expandable electronic cues 160, 170. As noted herein, a video 150 is an example of media content, and other forms of time-based media content may also be used in the example embodiments described herein. User device 110 may be any networked computing device capable of receiving user interaction including a display (or which can output to a display) a processor and memory, such as a personal computer, workstation, server, portable computer, mobile device, personal digital assistant, laptop, smart phone, WAP phone, an interactive television, a smart television, video display terminals, tablet, gaming consoles, an electronic reading device, and portable electronic devices or a combination of these.

User device 110 may display one or more videos 150 using a video player 180 and a display screen. Some video players 180 may include one or more of playback controls 190, a timeline 200, a playback position scrubber 210 and a display of a current timecode 220. For example, video player 180 may be implemented as a standalone software application, such as an applet running inside a web browser (e.g. programmed using Flash™, HTML5, or Silverlight™), local application, and so on. The video may be delivered to user device 110 as a streaming video or a download, for example. If the video is a download then the player used to playback video may be connected to a network to send and receive data regarding the electronic cue and the user interactivity.

In some cases, user device 110 for displaying video 150 may be a television equipped to receive user interaction via an input device such as a remote control or a keyboard.

User device 110 may be configured to receive any number of different user interactions. For example, user device 110 may be configured to process mouse inputs (e.g. movement, button clicks, hovers, scroll wheel rotations etc.), remote or wired button presses, touchscreen inputs (e.g. taps, swipes, drags, gestures) and so on. In some cases, user device 110 may respond to user inputs by adjusting the playback of the video (e.g. playing, pausing, fast forwarding or rewinding), changing video (e.g. switching to the next video, switching to a previous video) or interacting with electronic cues 160, 170.

Electronic cues 160, 170 may be configured to display simultaneously during the playback of video 150. Each electronic cue 160, 170 may be associated with a predetermined timecode during the playback of video 150. The timecode may correspond to a timecode of a video frame of the video 150, such that the electronic cue 160, 170 is displayed or otherwise presented when the video frame is displayed during playback of video 150. That is, electronic cue 160, 170 may be synchronizes with a video frame through the timecode to trigger simultaneously display. For example, a video may be a series of image frames, where each frame has an associated timecode corresponding to its playtime during playback of the video. When the playback of the video reaches a timecode associated with an electronic cue 160, 170, the electronic cue 160, 170 may be triggered for display along with the corresponding image frame. In the example shown, an electronic cue 235 (shown with broken lines) may not yet be displayed because the timecode in the playback of video 150 has not yet reached the predetermined timecode associated with electronic cue 235. The predetermined timecode may identify a time related to existing product placement database(s) and may also be chosen to maximize effectiveness in situations where no product placement data is available.

The electronic cue 160, 170, 235 may relate or positively correlate to content displayed within a video frame and the electronic cue 160, 170, 235 may be linked to the video frame through the predetermined timecode. Instead of a listing of product placements, in some embodiments there may be provided a listing of content items, each associated with content referenced within the media at different times. The content may be a reference to an event, a person, a place, and so on referenced within a video frame and a particular timecode. The content may be of a particular type or category and the category as a whole may be linked to electronic cues. The electronic cue may be associated with the content referenced at the particular timecode the electronic cue is linked to. For example, the electronic cue may provide further information relating to the content, or may provide a link to a website about the content, or may receive input data about the content, and so on. As an illustrative example, the content may depict the Rocky Mountains and the electronic cue may provide information about the area or a discount offer for a hotel in the area.

As shown in FIG. 2, there may be multiple electronic cues 160, 170, 235 displayed at different positions within the media. The different positions may be based on the time each electronic cue 160, 170, 235 is displayed. In this example, each electronic cues 160, 170, 235 is displayed along a timeline based on the time the electronic cue 160, 170, 235 is displayed. In other examples, a first electronic cue 160 may be displayed in one corner, a second electronic cue 170 may be displayed at a different time in another corner, and a third electronic cue 235 may be displayed at a different time in another corner.

Any one or more of the elements of system 100 may participate in triggering the display of an electronic cue 160, 170, 235 on user device 110 during the playback of video 150. In some cases, advertisement campaign server 120 or ad content server 135 may trigger the display of an electronic cue 160, 170, 235 when it detects a timecode in the playback of video 150 which corresponds to the predetermined timecode associated with the electronic cue 160, 170, 235. For example, the campaign server 120 or content server 135 may send an electronic cue 160, 170, 235 to user device 110 at the predetermined timecode (associated with the electronic cue 160, 170, 235) in the playback of video 150.

In some cases, some or all of the electronic cues 160, 170, 235 associated with the video 150 may be sent to the user device 110 in advance of displaying the electronic cue 160, 170, 235. The electronic cue 160, 170, 235 may be dynamically assembled in near real time and provided for display with the video. When the timecode in the playback of video 150 corresponds to a predetermined timecode associated with an electronic cue 160, 170, 235, campaign server 120, video content server 130 or content server 135 may trigger user device 110 to display or otherwise present the electronic cue 160, 170, 235.

In some cases, some or all of the electronic cues 160, 170, 235 associated with the video 150 may include metadata or instructions to display or present the electronic cue 160, 170, 235 at their associated predetermined timecodes that may be sent to the user device 110 in advance of displaying the video. The metadata may be assembled and sent in near real time. Accordingly, system 100 provides dynamic update capabilities to modify electronic cue 160, 170, 235 specifications and configurations. System 100 assembles the electronic cue 160, 170, 235 in near real time so that electronic cue 160, 170, 235 are dynamically updated to reflect those modifications as the campaign evolves. One or more of campaign server 120, video content server 130 or content server 135 may send user device 110 a plurality of dynamically assembled electronic cue 160, 170, 235 along with their associated predetermined timecodes in advance of user device 110 displaying the video, or in response to the user device 110 initiating the display of the video.

In some cases, user device 110 may receive all or a portion of video 150 with timecodes associated with electronic cue 160, 170, 235. User device 110 may be configured to request an electronic cue 160, 170, 235 from one or more of the elements of system 100 at the associated timecode in the playback of the video prior to reaching that timecode. System 100 can then trigger the display of the assembled electronic cue 160, 170, 235 on user device 110 along with the playback of the video 150.

In some cases, an electronic cue 160, 170, 235 may only be triggered for display when the timecode is exactly at (or within a certain time proximity to) its associated predetermined timecode. For example, if an electronic cue 160, 170, 235 is associated with the timecode 3:00 (i.e. 3 minutes) of video 150, then when the playback of video 150 hits 3:00, the electronic cue 160, 170, 235 may be triggered for display or presentation on the user device 110.

In some cases, an electronic cue 160, 170, 235 may be triggered for display whenever the timecode in the playback of the video is greater than or equal to the electronic cue's 160, 170, 235 associated predetermined timecode. If a user causes the video 150 to skip past a predetermined timecode associated with an electronic cue 160, 170, 235, the electronic cue 160, 170, 235 may be triggered for display as soon as the playback timecode is passed.

The electronic cue 160, 170, 235 may remain on the display for the remainder of the video or may disappear after a period of time has elapsed. That is, an electronic cue 160, 170, 235 may in some cases display continuously after it is triggered for display. For example, once an electronic cue 160, 170, 235 is triggered, it may continue to display on user device 110 until a new video begins playing. In some cases, an electronic cue 160, 170, 235 may display for a limited duration after it is triggered. For example, once an electronic cue 160, 170, 235 is triggered, it may continue to display on user device 110 for a prescribed period of time then disappear. The prescribed period of time may be specific to an electronic cue 160, 170, 235, to the video 150 or to the user device 110 for example.

One or more electronic cue 160, 170, 235 may be displayed concurrently. For example, during the playback of the video 150 more than one electronic cue 160, 170, 235 may be displayed. Multiple timecodes of the video will be associated with different electronic cue 160, 170, 235. If the electronic cue 160, 170, 235 are all configured to display continuously after being triggered, then the number of concurrently displayed electronic cue 160, 170, 235 may increment by one as each electronic cue 160, 170, 235 is triggered.

In some cases, an electronic cue 160, 170, 235 may be configured to respond to user interactions. For example, the electronic cue 160, 170, 235 may be an expandable electronic cue 170 which expands and/or contracts in response to user interaction. In the example shown, electronic cue 170 includes an icon portion 230 and a flyout portion 240. The flyout portion 240 may be configured to remain hidden until a pre-determined user interaction is detected. In the example shown, positioning the cursor 250 over the icon portion 230 may be the user interaction which has caused flyout portion 240 to display. The expandable electronic cue 170 may show only the icon portion 230 to only cover a small portion of the video until a user shows interest through a user interaction. When a user interaction is detected the expandable electronic cue 170 may expand to show the flyout portion 240. The flyout portion 240 may provide additional detail about the electronic cue 170 including a link to an electronic offer, additional content and so on.

The icon portion 230 and the flyout portion 240 may be configured in various configurations and formats. For example, the icon portion 230 may comprise a static or animated company logo, message, image, text or promotional offer (e.g. "50% off") or consist of predetermined, generic iconography related to additional content should no product promotional message be available. Similarly, flyout portion 230 may comprise a static or animated company logo or promotional offer or promote the availability of additional content. After electronic cue 170 is triggered and displayed, a user may become intrigued by the imagery or message in the icon portion 230. Out of interest, the user may then choose to interact with the icon portion 230 (e.g. by clicking on it or hovering a cursor over it, or other interactions, such as interactions that do not involve a mouse such as the case for gaming consoles, tablets or smartphones) to cause the display of flyout portion 240. The icon portion 230 and the flyout portion 240 may be interactive with the user interactions.

Flyout portion 240 may become visible in any of a number of ways. For example, flyout portion 240 may simply appear or may animate into position. In the example shown, the flyout portion 240 is positioned to the right of icon portion 230 and sized roughly the same as icon portion 230. In some cases, flyout portion 240 may be positioned in a different orientation relative to the icon portion 230 and may be larger or smaller than icon portion 230. Flyout portion 240 may touch or overlap icon portion 230, or the two portions 230, 240 may be separated.

In some cases the display screen position for the display of an electronic cue 160, 170, 235 may be determined based upon the predetermined timecode associated with the electronic cue 160, 170, 235 and the playtime (i.e. time length or duration) of the video.

In a simple example, advertisements may be positioned along a predefined path (e.g. a straight line at the bottom of the video), from left to right, according to their percentage position in the playback of the video (such as for example $$\left(\frac{\text{(Predetermined Associated Timecode)}}{\text{(Playtime of the Video)}}\right)$$

As an example, an electronic cue that is associated with a timecode that is positioned one quarter of the video time duration from the beginning of the video may be displayed at a position that is one quarter along the predefined path.

In some cases the display screen position for the display or presentation of an electronic cue may be determined according to any one or more mathematical formula which includes the predetermined timecode associated with the advertisement and the playtime of the video. For example, the display screen position for the display of electronic cue associated with a video may track an irregular path around the perimeter of the video. As another example, the positions may track a timeline 200 of the video. As another example, the positions may track the corners of the electronic cue. Other position structures and orientations may be used.

In some cases the display screen position for the display of an electronic cue may be arbitrarily defined. For example, the display screen position for electronic cue associated with a video may be determined using a predefined table of display screen positions cross-referenced against a percentage position in the playback of the video (for example $$\left(\frac{\text{(Predetermined Associated Timecode)}}{\text{(Playtime of the Video)}}\right).$$

Other algorithms may be used to determine display positions. Each display position is associated with a video timecode.

In some cases, playback of video 150 may include the display of a timeline 200. Timeline 200 may be displayed overlapping video 150 or to the side. Timeline 200 may be vertically aligned, horizontally aligned (as shown), curved (e.g. like a clock face) or following a complex path or not displayed at all.

Timeline 200 may include a number of timeline positions, where each timeline position corresponds to a video timecode in the playback of video 150. For example, from left to right, each timeline position along timeline 200 may linearly correspond to video timecodes in the playback of video 150 from video start to video finish. In some cases, timeline 200 may include a playback position scrubber 210 which is continuously or periodically repositioned to the timeline position corresponding to the current timecode in the playback of video 150.

In some cases, the position of electronic cues 160, 170, 230 may be determined based upon the timeline position along timeline 200 which corresponds to the predetermined timecode associated with each electronic cue 160, 170, 235. For example, electronic cue 160 may be positioned centered and above the timeline position corresponding to the predetermined timecode associated with electronic cue 160. An example display is shown in FIG. 2. For example, the electronic cue 160 may be an icon positioned along the timeline 200 of the video 150. The electronic cue 170 may have an icon portion 230 and a flyout portion 240 positioned along the timeline 200. The electronic cue 160 may be discrete so as not to interfere with the display of the video 150 but still enabling receipt of data regarding user interactions with the electronic cue 160, 170 and display of information by the electronic cue 160, 170. The data regarding user interactions with the electronic cue 160, 170 may be collected in near real time and analyzed by system 100 to dynamically update and modify the electronic cues 160, 170, 235 based on the calculated metrics. The system 100 is operable to dynamically alter the content of the electronic cue 160, 170, 235 linked to the various timecodes represented in the timeline 200 during playback of video 150. A video 150 may have different electronic cues displayed or presented depending on the time, date, user device 110, user behavior, etc.

In some cases the video content that the user/viewer was watching suspends play when they choose to interact with the flyout portion 240 using any of the methods described herein. For example, the user may be automatically linked to a sponsor's web site, additional content, micro site or social network page where a flyout offer can be fulfilled. Once completed the viewer can returns to the video at exactly the same place where it was suspended. In other cases, a flyout offer may change where the video 150 resumes from. For example, the video 150 may relate to a non-linear, branching narrative and the viewer may choose their own adventure or path through the video 150 using the flyout portion 240, and may not return to the initial time and frame of the video 150 that they left the video 150 at, and instead may return to a selected time in the plot. As another example, the video 150 may be restarted. This may address concern that the user will miss video 150 content by responding to an offer presented by the electronic cue 160, 170, 235 at any point during the playback, unless the link relates to choosing the storyline from multiple possible plot points, or distance learning such as a "learn more about X" link, and so on.

The electronic cue 160, 170, 235 may be operable to collect user input, such as user interactions, text, button activations, and other types of input. For example, an electronic cue 160, 170, 235 may include comprise a text field and a submit button. The user may press the submit button (or enter key etc.) to submit the information (e.g. user input) entered within the text field to a third party destination, such as server 1, database, etc. The user input may be received from contest entry, subscription services, search, and so on. For example, the electronic cue 160, 170, 235 may include a search box with a text field for receiving search queries. The icon portion 230 may include a logo indicating the provider of the search feature and when the user hovers over or clicks the icon portion 230 then flyout portion 240 may display. The flyout portion 240 may include the search text field for receiving the search query. The search results may be presented within the same display window as the 150 or within a different display window.

As noted herein, the electronic cue 160, 170, 235 may be expandable and may include an icon portion 230 and a flyout portion 240. The flyout portion 240 could be larger or smaller than the icon portion 230. The flyout portion 240 may replace the video viewing experience, and may cover the display of the video 150. The large flyout portion 240 may be used in both non-linear branching narratives and gaming, as an example. A user may hover over, click, or otherwise interact with the flyout portion 240, and flyout portion 240 becomes a new video layer and plays content, such as new time-based media. This new time based media may also be associated with electronic cues. When the content ends or the user closes this new video layer, then user returns to the video 150 that contained the expandable electronic cue 160, 170, 235. The original video 150 may be paused until the user returns to and restarts the original video 150.

The electronic cue 160, 170, 235 may be a visual cue displayed during playback of video 150 but may also be an auditory cue, or a combination thereof. The auditory cue may be used to draw attention to the fact that an electronic cue 160, 170, 235 has been inserted into the video 150. This may help draw attention to the electronic cue 160, 170, 235. The auditory cue volume may be less than the video 150 into which it is inserted to preserve the video viewing experience. The electronic cue 160, 170, 235 may also be implemented as an animation. The animation may display multiple logos such as when an advertisement for a brand that may have multiple products, wherein each logo corresponds to a different product or feature of a product. As an example, an electronic cue 160, 170, 235 for a vehicle may appear in the video 150. When the user hovers over the electronic cue 160, 170, 235 then the icon portion 230 of the electronic cue 160, 170, 235 spins/animates to display a logo for a particular type of vehicle and the flyout portion 240 may appear with a specific call to action. In addition, an icon portion 230 and a flyout portion 240 may animate after a per-determined amount of time without needing user interaction. The electronic cue 160, 170, 235 may also be associated with a voice over IP (VoIP) application. The icon portion 230 may refer a logo or text for a provider of the VoIP and the flyout portion 240 may provide a link to make VoIP call via the provider and may insert a phone number, username, or other contact information to make the call. As another example, may provide an electronic cue 160, 170, 235 "click to call" function where a user interaction with the icon portion 230 may initiate a VoIP program and may insert related phone number or other contact into the VoIP application to trigger call. A user may press a "call" button to initiate the call. The VoIP function may be used for a help desk, customer service, contests, "call for more info" offers, direct response videos, live webcast call-in, and so on.

The electronic cue 160, 170, 235 may be used to implement an advertisement campaign. An interactive advertising client may implement "opt-in" advertising, such that a user is required to opt-in to a campaign in order to receive advertisements. A user will be able to turn off the functionality of an electronic cue 160, 170, 235 that provides advertising.

The electronic cue 160, 170, 235 may also be used to implement a loyalty program. The user may sign up for a loyalty program via provider system and may sign in, each time they watch videos 150 related to the provider system. Users who have signed in are segmented within the database, identified as members and, served electronic cue 160, 170, 235 that are identified as generating points (i.e., gift box icon, coin icon). A user hovers over or clicks the loyalty electronic cue 160, 170, 235, the electronic cue 160, 170, 235 animates to show the icon portion 230 with the logo of the sponsor while the fly-out portion 240 appears with a call to action. Users may accumulate points with hover/click function. The loyalty points can be redeemed through a third party redemption company.

The electronic cue 160, 170, 235 may also be used to provide feedback related to the time-based media such as by submitting comments, ratings, reviews, and so on in relation to distinct timecodes with the video 150 during playback. The electronic cue 160, 170, 235 may prompt for user feedback in relation to different video frames at different timecodes. As an example, this feature may be used by video editors to test certain scenes of a video and receive feedback on specific scenes to determine whether they should be cut or not from the final version of the video 150. Other example electronic cues 160, 170, 235 and use cases may be provided by embodiments described herein.

Figure 3:
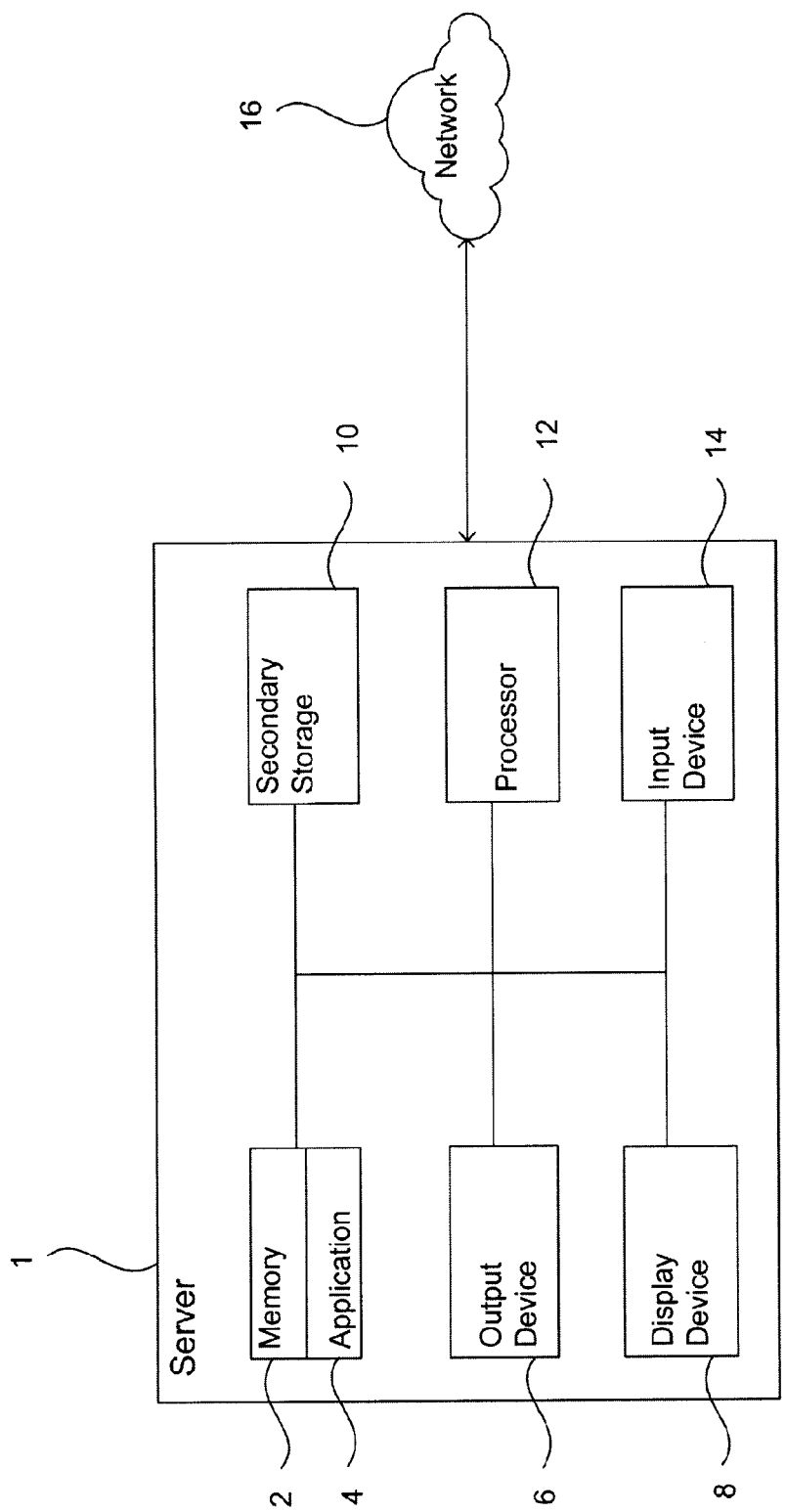
FIG. 3 is a block diagram showing an example of hardware components of a campaign server and other machines and components which interact with the server in accordance with embodiments described herein.

FIG. 3 shows an example server 1 illustrating exemplary hardware components of campaign server 120 and other computing devices and components used by the system, such as video content server 130, content server 135 and product placement server 140. These are non-limiting examples components of campaign server 120 and fewer or additional components may be included. Server 1 includes a connection with a network 16 such as wired or wireless connection to the Internet or other type of computer or telecommunication networks, which may correspond with the network(s) 145 shown in FIG. 1. Server 1 typically includes a memory 2, a secondary storage device 10, a processor 12, an input device 14, a display device 8, and an output device 6.

Memory 2 may include random access memory (RAM) or similar types of memory, and it may store one or more applications 4 for execution by processor 12. Applications 4 may correspond with software modules comprising computer executable instructions to perform processing for the functions described below. Secondary storage device 10 may include a hard disk drive, floppy disk drive, CD drive, DVD drive, Blu-ray drive, or other types of non-volatile data storage. Processor 12 may execute applications, computer readable instructions or programs stored in memory 2 or secondary storage 10, or received from the Internet or other network 16. Input device 14 may include any device for entering information into server 1, such as a keyboard, key pad, cursor-control device, touch-screen, camera, or microphone. Display device 8 may include any type of device for presenting visual information such as, for example, a computer monitor, flat-screen display, projector or display panel. Output device 6 may include any type of device for presenting a hard copy of information, such as a printer, and may also include other types of output devices such as speakers for playing auditory cues, for example. In some cases, server 1 may include multiple processors, applications, software modules, second storage devices, network connections, input devices, output devices, and display devices.

Although server 1 is depicted with various components in this example, in other example embodiments the server 1 may contain additional or different components. In addition, although aspects of an implementation consistent with the present invention are described as being stored in memory, these aspects can also be stored on or read from other types of computer program products or computer-readable media, such as secondary storage devices, including hard disks, floppy disks, or CDs, DVDs; a carrier wave from the Internet or other network; or other forms of RAM or ROM. The computer-readable media may include instructions for controlling server 1 and/or processor 12 to perform a particular method.

Referring again to FIG. 1, an example campaign server 120 is shown comprising a data integration module 260, relevance module 270, a campaign setup module 280, a tracking module 290, a campaign monitoring module 300, and a video mapping system 265.

As an illustrative example, electronic cue 160, 170, 235 will be described as an advertisement. Data integration module 260 may receive video information from one or more video content servers 130, and product placement information from one or more product placement servers 140. In some cases, video content server(s) 130 may be a publisher of video content, or interact with hardware serving video content from a publisher. The video content may also be published by one or more other publishers in the same or different formats (e.g. television or internet streaming). Hulu® is an example of a video content server which publishes videos which were formerly published by other video content servers (e.g. televised by cable, satellite or IP TV providers). Other examples include Rogers™, Bell™, NBC™, FOx™, CBS™, etc.

Product placement server(s) 140 may be a provider of product placement information comprising an indexed tabulation of videos, product placements and timecodes corresponding to the product placements in those videos. A product placement may be a visual or auditory reference to a product or a brand. Videos may be live, television, film, and so on. For example, product placement server 140 may provide product placement information indicating each timecode position in each indexed video where an Apple® product is shown, used, or spoken of. AC Nielsons®, BBM Canada® and TNS Global® are three examples of product placement servers.

Data integration module 260 may process video information received from video content server(s) 130 and product placement information from product placement server(s) 140 to identify product placements (and in some cases their timecodes) found in videos published by each video content server 130.

Data integration module 260 may identify the correspondence between the video identifiers used by the video content server(s) 130 and the videos identifiers used by product placement servers 140. In some cases, video content server 130 may provide data integration module 260 with a library list of videos including unique video identifiers. These unique video identifiers, however, may be different from video timecodes used in the product placement information from the product placement servers 140. In that case, data integration module 260 may determine the correspondence between the videos published by video content server 130 and the videos identified in the product placement information using one or more of knowledge of the video identifier naming conventions, series and/or episode titles, air date and video network names, for example.

Data integration module 260 may interact with video mapping system 265 to generate a listing of advertisement options for particular videos. Video mapping system 265 may contain a database mapping of processed product placement information and video information for efficient retrieval and subsequent use. The video mapping system 265 may scrub and normalize data for comparison and benchmarking. The video information may include a listing of video inventory and a listing of all available electronic cue 160, 170, 235 (e.g. advertisements). The video mapping system 265 may output a sublist of videos for particular electronic cue 160, 170, 235. An electronic cue 160, 170, 235 and video timecode pairing is recorded. The electronic cue 160, 170, 235 may be dynamically generated to ensure up-to-date content is used.

Relevance module 270 may determine the relevance of an electronic cue 160, 170, 235 to one or more of a brand, campaign and a viewer. In some cases the relevance module 270 may determine the relevance of a video to a brand. The brand relevance evaluation may be based upon one or more of the genre of the video (e.g. documentary, action, drama, or comedy), the topic category or categories (e.g. snowboarding, love story, or crime fighting) and the product placements in the video. For example, the relevance module 270 may determine that a snowboarding documentary which features no product placements for Microsoft®, its products or its competitors has low relevance to the Microsoft® brand. On the other hand, the relevance module 270 may determine that a football drama which features a number of product placements for Nike® shoes is highly relevant to the Nike® brand. The relevance module 270 will also consider different factors such as the user demographics, video viewing projections, ad campaign specifications. The relevance module 270 is operable to interact with the video mapping system 265 to generate sublists of videos and electronic cue 160, 170, 235, as well as rank the items on the sublists. Feedback may be received from user interactions to update and modify the list and ranking in real-time.

In some cases, the relevance module 270 may determine the relevance of a video to a particular viewer. The viewer relevance evaluation may be based upon the demographics of the user, their geographic location and their historical behavior (e.g. website visits, online purchases, television, media consumption purchases), for example. For example, the relevance module 270 may consider the Twilight® brand to be highly relevant to viewers that are 12-16 years old, located in the USA and which have a browsing history including Twilight® fan websites.

In some cases, the relevance module 270 may determine the relevance of a particular timecode in a video to a brand. The timecode relevance evaluation may be based upon the timecodes of product placements in the video. For example, the relevance module 270 may consider timecodes within 30 seconds of a brand's product placement in a video to be highly relevant to a brand. On the other hand, the relevance module 270 may consider timecodes 2 hours away from a relevant product placement in a video to be less relevant, for example.

Campaign setup module 280 may store campaign specifications relating to electronic cues 160, 170, 235 for clients and provide an interface where clients can setup and edit their campaign preferences and specifications, and the electronic cues 160, 170, 235 of their campaign. In some cases, campaign setup module 280 may permit a client to choose their electronic cue 160, 170, 235 and dynamically update the contents of the electronic cue 160, 170, 235 based on user interaction with the electronic cue 160, 170, 235, for example. The campaign setup module 280 may generate and provide metrics regarding the campaign so that client can dynamically update specifications in response. For example, the client may be able to choose to use an expandable electronic cue 160, 170, 235 as describe with reference to FIG. 2. In some cases, client device 115 may send campaign setup module 280 media content for an icon portion 230 and a flyout portion 240 of an expandable electronic cue 160, 170, 235. Campaign setup module 280 may then assemble the expandable electronic cue 160, 170, 235 using the media content. Once assembled, the electronic cue 160, 170, 235 may be subsequently delivered to user device 110 by campaign server 120, or by ad content server 135. In the latter case, campaign server 120 may deliver the expandable electronic cue 160, 170, 235 to ad content server 135 in advance. In some cases, other electronic cue 160, 170, 235 types may be available for selection by the client. For example, =campaign server 120 may provide a list of selectable electronic cue 160, 170, 235 types, formats, with or without audio, and user-interactivities. The content of the electronic cue 160, 170, 235 may also change and be updated to selected new phrases, icons, configurations, text, etc.

Campaign setup module 280 may store viewer targeting parameters specified by a client for their campaign specification. In some cases, only viewers which meet the specified parameters may be eligible to receive the electronic cue 160, 170, 235. For example, a client (e.g. a cosmetics company) may choose to limit their electronic cue 160, 170, 235 to viewers of particular demographics (e.g. females only) from particular geographies (e.g. North America only), and to those exhibit particular behaviors (e.g. visit cosmetics websites regularly). This may represent one way that a client can help tailor their campaign to their viewers. The computed metrics may provide that a particular city responds well then the ad content could be tailored specifically to that demographic, behavior and locale.

The campaign setup module 280 may also store video and timecode targeting parameters specified by a client for their campaign specification. In some cases, the client's electronic cue 160, 170, 235 may only be displayed with the chosen videos, and only at the chosen timecodes (if selected). For example, a client may choose to limit their electronic cue 160, 170, 235 to videos which fall into certain categories, genres and/or topics. In some cases, clients may be able to choose specific videos with which their electronic cue 160, 170, 235 should display. The relevance module 270 may evaluate which videos are relevant to the campaign's brand and interact with video mapping system 265 to provide a shortened list of videos for the client to select from for their electronic cue 160, 170, 235.

In some cases the campaign setup module 280 may permit a client to specify whether their electronic cue 160, 170, 235 should display at or near the timestamp of a relevant product placement in a video or else at a different arbitrary time (e.g. from the start of the movie). For example, the client may be able to specify that the display of their electronic cue 160, 170, 235 be triggered five seconds before the timecode of the most relevant product placement in the selected list of videos.

The campaign setup module 280 may also permit a client to specify one or more of the start and end dates for their campaign, the maximum number of electronic cue 160, 170, 235 exposures, the maximum number of engagements and the maximum number of click throughs. An electronic cue 160, 170, 235 exposure may be registered when the electronic cue 160, 170, 235 is displayed or otherwise presented to a user (e.g. media consumer). An electronic cue 160, 170, 235 engagement may be registered when a user interacts with an electronic cue 160, 170, 235 in a specific way. For example, an engagement of expandable electronic cue 170 of FIG. 1 might be registered when a user interacts with the icon portion 230 causing the flyout portion 240 to display. User interactions which can cause the flyout portion 240 to display may be limited to a predetermined one or more user interactions (e.g. a mouse click or a cursor hover). A click through may be registered when a user clicks or otherwise interacts (e.g. presses a button, or hovers a cursor) with an electronic cue 160, 170, 235 such that the advertiser's website, popup, or mini-site is displayed for example.

The campaign setup module 280 may also provide price determination and payment functionality. For example, the price of a campaign to a client may comprise one or more a fixed price component (e.g. one-time fee), a variable price component (e.g. per exposure, engagement, click-through, and/or day) and a bid price component. In some cases, a video may be selected for use with more campaigns than the video can support. For example, if an advertisement from every campaign that selected a particular video was displayed during the playback of that video, the electronic cue 160, 170, 235 may be too cluttered and/or they may be too distracting for the video viewers. In some cases then, the campaign setup module 280 may provide a real time bidding system.

The real time bidding system may be integral to campaign setup module 280, or it may be provided by a separate module within campaign server 120 or by a separate third party server. In some cases the real time bidding system may permit clients to bid for priority over certain aspects of their campaign. For example, clients may be able to bid for priority or exclusive display of their electronic cue 160, 170, 235 in association with a particular video, timecode or product placement. In some cases, especially where a campaign has chosen an entire category, genre or topic of videos, the client may be able to bid for priority or exclusive display of their electronic cue 160, 170, 235 in videos with a certain level of popularity (e.g. greater than one million viewers per month). In some cases, a campaign may be able to bid for priority or exclusive display of their electronic cue 160, 170, 235 to viewers meeting specific demographic and geographic criteria (e.g. North American and female). In some cases, a client may place bids for priority or exclusive display of their electronic cue 160, 170, 235 between specified starting and ending dates. In some cases, a client may bid on a predetermined number of viewer impressions across all media present within an existing media network.

The campaign tracking module 290 may track the number of impressions, engagements, click-throughs and other user interactions with an electronic cue 160, 170, 235. In some cases, the campaign tracking module 290 may track the number of times users resume a video after click-through (which may in some cases cause the video to pause). In some cases, the campaign tracking module 290 may track the number or value of purchases made following a click-through to an advertiser's webpage.

The campaign tracking module 290 may receive user demographics which include social media behavior. Electronic cues 160, 170, 235 may be tailored to specific individuals that have high rankings for social media influence. The rankings may be generated by third party systems and records, and then provided to system 100. The system 100 may receive endorsement data to suggest specific users for targeted advertisements. The social media behavior information may include information relating to whether the electronic cue and video was shared to other users, and whether other users interacted with the electronic cue, and how many other users where indirectly led to the electronic cue.

The campaign monitoring module 300 may use tracking information collected by campaign tracking module 290 to provide reporting functionality for campaigns. In some cases, campaign monitoring module 300 may determine one or more performance scores based upon data from the campaign monitoring module 300. For example, the performance score may equal the number of click-throughs, conversion ratio of call to actions (i.e. the entered sweeps, printed coupon signed up for newsletter, and so on, or the value of purchases following click-throughs over a period of time. In another example, the performance score may be an arbitrary scoring system based upon purchases, click-throughs, engagements and impressions (e.g. one score point for an impression, two for an engagement, three for a click-through, and one point for each dollar spent). The performance score may be a combination of weighted factors.

The one or more performance scores may be displayed in a ticker. In some cases the ticker display may include a plus/minus difference in comparison with a performance score from a previous period (e.g. from the previous day). In some cases, the ticker display may include a plus/minus difference in comparison with a target performance score.

In some cases, the campaign monitoring module 300 may provide a real time or near real time visualization of data from campaign tracking module 290. Campaign monitoring module 300 may provide data visualization for one or more of impressions, engagements, click-throughs, and resulting purchases. In some cases, campaign monitoring module 300 may help to visualize the effects of changes to a campaign in real time or near real time. This may permit clients to rapidly efficiently modify their campaign to maximize performance.

Campaign monitoring module 300 may receive real time updates to campaign specification to tailor the electronic cues in near real time. For example if specific ad content is showing high interactivity then an increased number of electronic cues may be configured with that same content.

Figure 4:
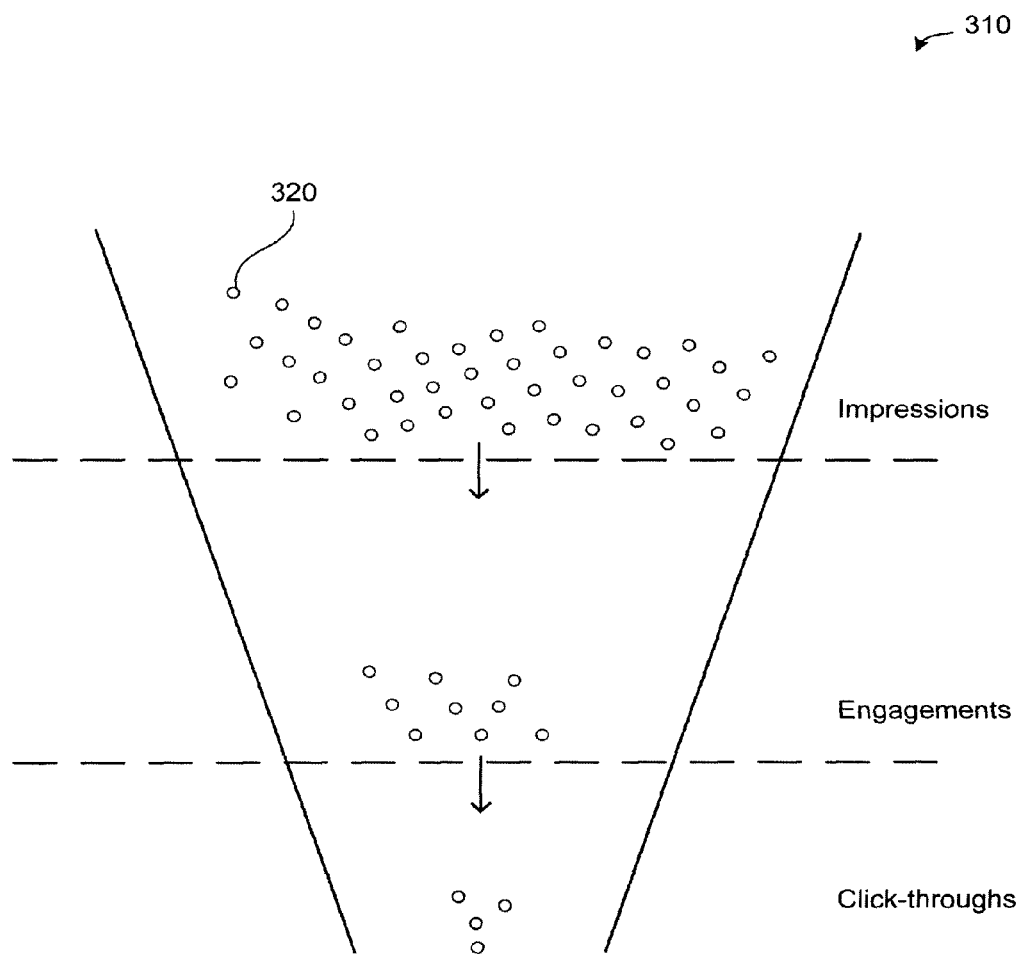
FIG. 4 is a diagram showing an example data visualization in accordance with embodiments described herein.

For example, FIG. 4 shows an example visualization 310. The example visualization 310 is in the form of a funnel animation. In this example, the electronic cue that is the subject of the animation registers three phases: impressions (e.g. the advertisement is displayed), engagements (e.g. the electronic cue expands upon interaction) and click-throughs (e.g. the expanded portion of the electronic cue is clicked on or otherwise interacted with). In the example visualization 310, users are represented by circles 320. Each circle 320 may represent one or more users. In some cases, the circles 320 may be shown appearing and entering the topmost section of the funnel as users are exposed to the advertisement that is the subject of the campaign (e.g. the electronic cue is displayed on user devices 110). As users interact with the electronic cue, engagements are registered and circles 320 representing those users travel to the engagement section of the funnel. When users further interact with the electronic cue, (e.g. click on a flyout portion redirecting them to a provider's webpage), then a click-through is registered and the circles 320 representing those users travel to the click-throughs portion of the funnel. The visualization may also illustrate other user interactions such as flyouts, click through, site purchases, revenue, sweeps entry, questionnaire, coupon, order a sample, order product, purchase, book a test drive, revenue. The funnel metaphor is an example of one visualization and other formats of visualizations may be used.

Referring again to FIG. 1, campaign monitoring module 300 may also provide historical analysis tools. In some cases, campaign monitoring module 300 may provide historical comparisons of data subsets. For example, campaign monitoring module 300 may compare minimum, maximum, or average values of any subset of data collected by campaign tracking module 290. In some cases, the historical analysis tools may compare the performance of a campaign by subdividing the data according to one or more of the campaign parameters selected in the campaign setup module 280. For example, the historical analysis tools may compare the performance of a campaign module by subdividing the data according to one or more of the media content in the electronic cue, the viewer targeting criteria, the video targeting criteria and the timecode targeting criteria. By monitoring this in near real time the advertiser has the ability to further refine their message and increase viewer engagement.

Figure 5:
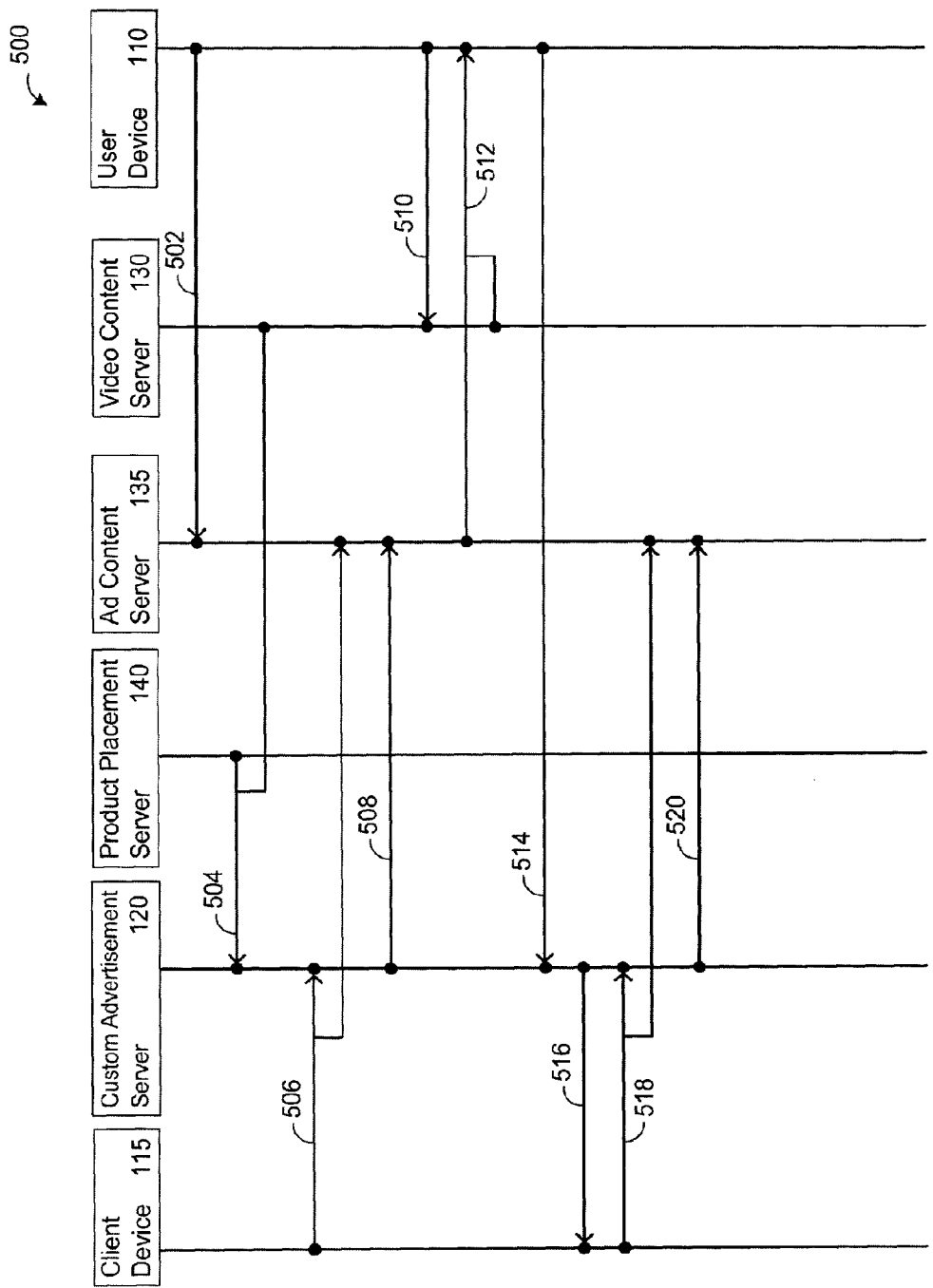
FIG. 5 is a diagram showing an example process flow of the system where the electronic cue is an advertisement in accordance with embodiments described herein.

FIG. 5 shows an example process 500 according to at least some embodiments. In some cases, the process steps shown in the example process 500 may be executed in a different order than shown. At 502 ad content server 135 may collect demographics and behavioral information from user device 110. For example, ad content server 135 may collect information such as age, gender, geographic location, web browsing history and purchase history from user device 110. For this illustrative example, the electronic cue may implement an advertisement.

At 504, campaign server 120 may receive video information from video content server(s) 130 and product placement information from product placement server(s) 140. For example, campaign server 120 may receive a library list of videos from video content server(s) 130 and a list of product placements by video from product placement server(s) 140. In some cases, data integration module 300 of campaign server 120 may identify the correspondence between the videos provided by the video content servers 130 and the videos identified in the product placement information from the product placement servers 140. The video information may include publishers list of video inventory, video categories, product placement, timecodes, specific video data, and so on. The campaign server 120 may scrub the video and product placement data and interact with the video matching system 265 to generate a sublist of videos corresponding to electronic cues.

The video matching system 265 is operable to perform a transformative process on the listings to generate a sublist to select an electronic cue.

The video matching system 265 is operable to match the paid product placement information (such as ACN in North America and TNS in Europe, Australia, and Asia for example) with the video library available from publisher system for content videos, such as videos rebroadcast on demand from web broadcast rights owners (such as MSN, YouTube, Yahoo, AOL). This inventory of paid product placement information is then available in a manual or automated real time bidding exchange such that a brand owner can purchase an in video display or other dynamic advertisement synchronized with the actual time the product appears as a prop, mention or in scene background.

The video matching system 265 is operable to scrub third party and web broadcast rights owners to identify common data variables such as for example: the network the show was originally broadcast; program name; episode; original air data; product identifiers, and start time of show. This data from both source types may be matched by matching algorithms and available for further processing.

The video matching system 265 is operable to pin point key placement moments with additional variables that enable the calculation of the exact moment the product placement occurs such as: exact timecode in the video when the product placement occurred; type of placement (placement intensity is indicated by; High: prop used in the scene, Medium: a mention by the characters, or Low: a very subtle visible background in scene—or combinations of these types); duration of the moment the product placement occurred (in seconds).

Once the received and processed data is standardized, corrected and missing variables completed and matched from both sources it can then be further transformed. For example, one transformation may be calculated by start time minus time of placement provides a placement moment. This is the amount of time into the video the placement occurred. This placement moment triggers the electronic cue to display at the corresponding timecode. The video matching system 265 is operable to calculate the duration (in seconds) the placement occurred so the electronic cue may be removed after exposure and the redisplayed at the end of the video.

The electronic cue is exposed at the moment of the product placement and the viewer can choose to interact with the electronic cue to enable further transformations. If the flyout portion of the electronic cue is activated and a link to an electronic offer is activated then the video pauses at that moment and the viewer is directed to the electronic offer on the brands' website, campaign micro site or social network (i.e. Facebook) where the brand owner can convert the viewer based on the campaign objectives (i.e. enter contest, share with friends, print/request coupon, purchase product). The client device is then redirected to the video to resume from the moment the video paused. The flyout portion may include information about the electronic cue, campaign, content of media, plot information, sweeps entry, questionnaire, coupon, order a sample form, order product form, purchase form, book a test drive, and so on.

At 506, client device 115 may send campaign specification information to campaign server 120 and to ad content server 135. In some cases, client device 115 may send basic campaign parameters such as campaign start and end dates, as well as viewer targeting parameters to ad content server 135 and the number of electronic cues to display for the campaign. Alternatively, client device 115 may send this information to campaign server 120. In some cases campaign server 120 may send this information to content server 135. The information may be transformed and processed at the various stages.

In some cases, client device 115 may send campaign server 120 electronic cue selections including electronic cue type (e.g. expandable, or fixed banner) and associated media (e.g. pictures, audio or video) for including in the electronic cue. Client device 115 may also send campaign server 120 video and timecode targeting parameters, comprising one or more of video, category, genre, and timecode selections.

Campaign server 120 may identify a list of videos and timecodes based upon the video and timecode parameters from client device 115, the video information from video content server(s) 130 and the product placement information from product placement server(s) 140, and the campaign specification. For example, campaign server 120 may identify videos from the video libraries of video content server(s)

130, and identify timecodes within those videos which include product placements relevant to the campaign specification. A listing may be generated for provision to other system 100 components.

At 508, campaign server 120 may send to ad content server 135 a list of videos and/or timecodes which are considered suitable for the campaign specification. The campaign server 120 may select the electronic cue and videos from this list and timecodes.

At 510, the user device 110 may send a request to video content server 130 to view a video. For example, user device 110 may load a webpage including an embedded video player. In another example, user device 110 may choose a channel to view on their television or internet application or other connected computing device.

Content server 135 may be notified of the video requested by user device 110 either from user device 110 or from video content server 130, for example. Content server 135 my then identify one or more electronic cues (which may comprise an electronic cue submitted by client device 115) based upon the list(s) of videos and/or timecodes from ad content server 135. The video mapping system 265 may generate the list using electronic cue, product placement, video inventory, as well as the user's collected demographics and behavior information. For example, ad content server 135 may identify electronic cues from campaigns for which campaign server 120 has sent a video and/or timecode list. The campaign may specify a particular video on that list.

In some cases, content server 135 may send a request to campaign server 120 for electronic cues that should be displayed with the video requested by the user device. Campaign server 120 may then identify one or more electronic cues that are relevant to the video based upon campaign parameters stored at campaign server 120. In this case, campaign server 120 may send ad content server 135 a reply including electronic cue and/or timecodes for display with the video.

At 512, video content server 130 may send at least some of the selected video to user device 110 and ad content server 135 may send the identified electronic cue to user device 110. The exact timing of the delivery of the electronic cue depends on the triggering algorithm for this advertisement and the timecode. For example, ad content server 135 may send the identified electronic cue to user device 110 immediately along with display triggering instructions (e.g. comprising a timecode), or ad content server 135 may wait to send the identified electronic cue to user device 110 until it is to be displayed.

For example, an electronic cue submitted by client device 115 as part of the campaign may be sent to user device 110 and user device 110 interacts with the electronic cue thus registering an engagement or user interaction. At 514, campaign server 120 may record the engagement and user interaction with the electronic cue by user device 110.

At 516, campaign server 120 may send client device 115 a report, or data visualization for the campaign, which may include the registered engagement and other user interactions. The data may include transformed and processed data regarding the interactions and demographics, and historical behavior.

At 518, client device 115 may send to campaign server 120 and content server 135 updated campaign specification information. For example, in reaction to the report or the data visualization received at 516, the client device 115 may submit updated video, timecode or viewer targeting parameters. In some cases, client device 115 may update the advertisement media content (e.g. graphics, audio, video). For example, client device 115 may update the media content to display a different offer (e.g. "75% off") or a different message in hopes that the new message or offer will attract more user interaction, or based on data analysis regarding other advertisements.

Campaign server 120 may identify a new or updated list of videos and/or timecodes based upon the updated campaign specification information. At 520, campaign server 120 may send the updated list(s) to content server 135, which list custom server 120 may now use when selecting electronic cues for user device 110 and other user devices.

These steps may be repeated and returned to depending on the length of the campaign and the received user interactions and updates. The electronic cues may be changed over the campaign and system 100 provides dynamic near real time assembly of the electronic cues to capture updates. The system 100 collects data regarding the videos, products, electronic cues, user interactions, demographics, third party statistics, pricing modules to provide a dynamic electronic cue implementation. The system 100 enables near real time review and processing of the data to continuously update the campaign specification and content.

Figure 6:
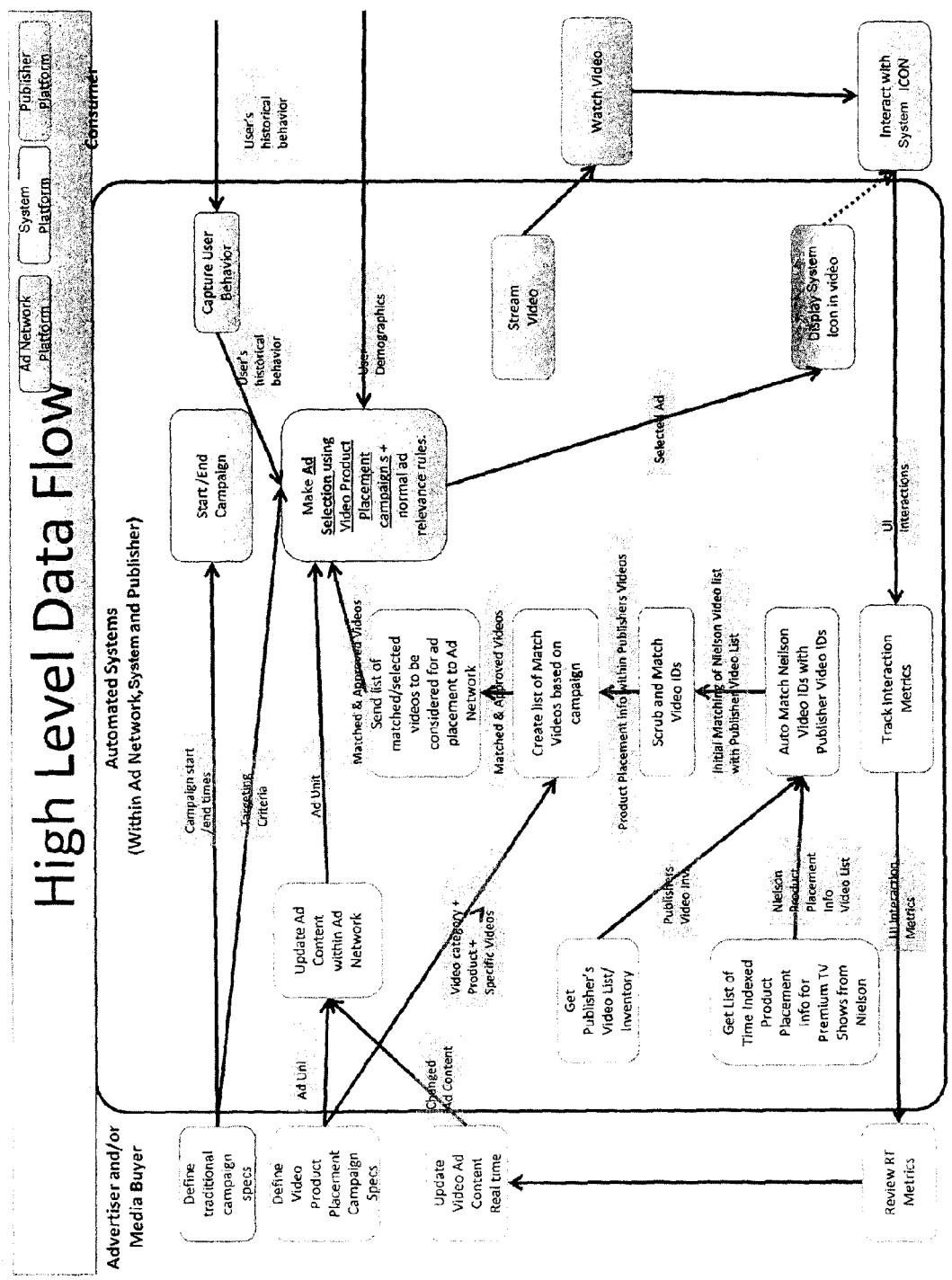
FIG. 6 is diagram showing an example data flow in accordance with embodiments described herein.
Figure 7:
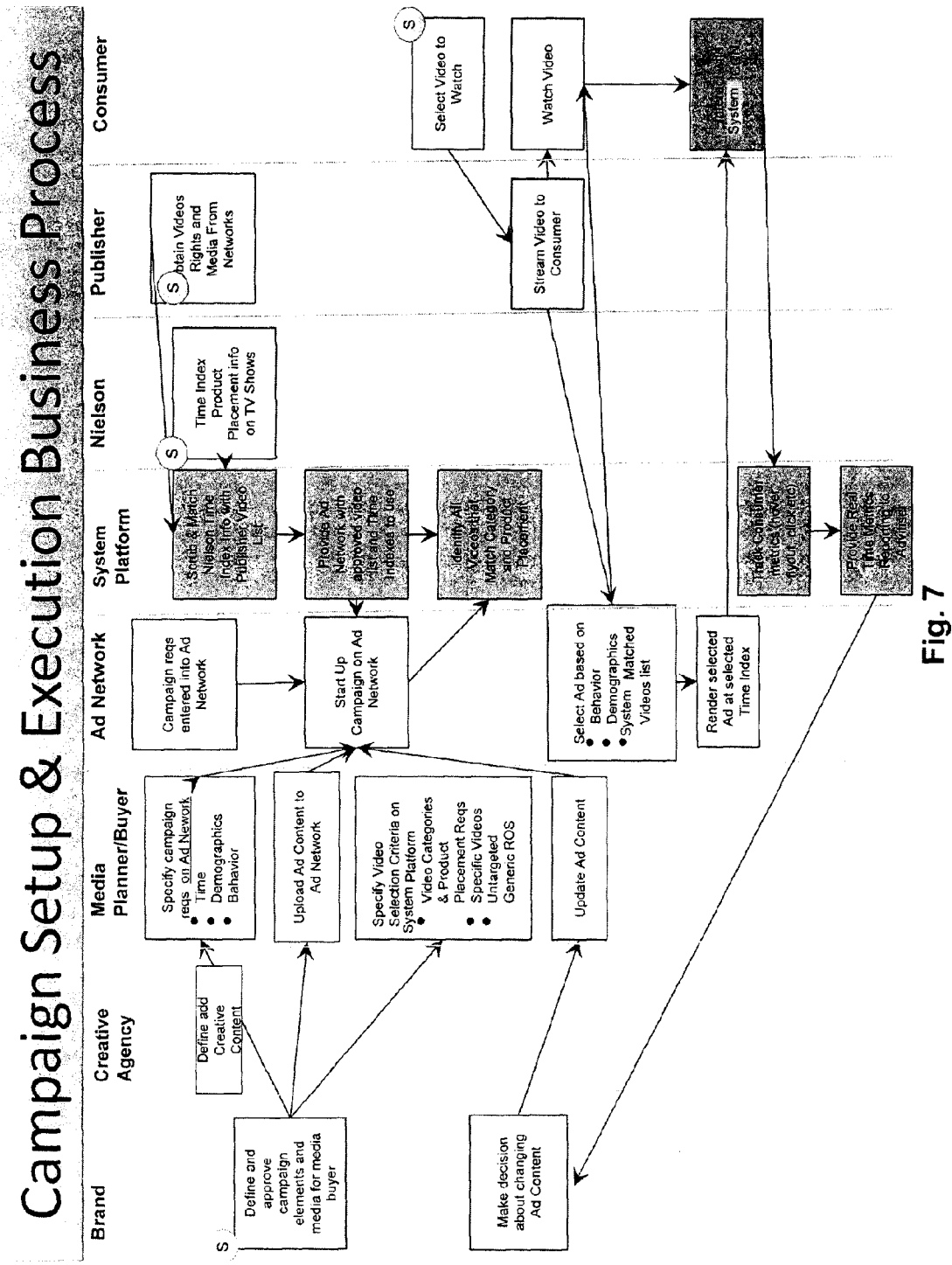
FIG. 7 is diagram showing an example campaign set up in accordance with embodiments described herein.
Figure 8:
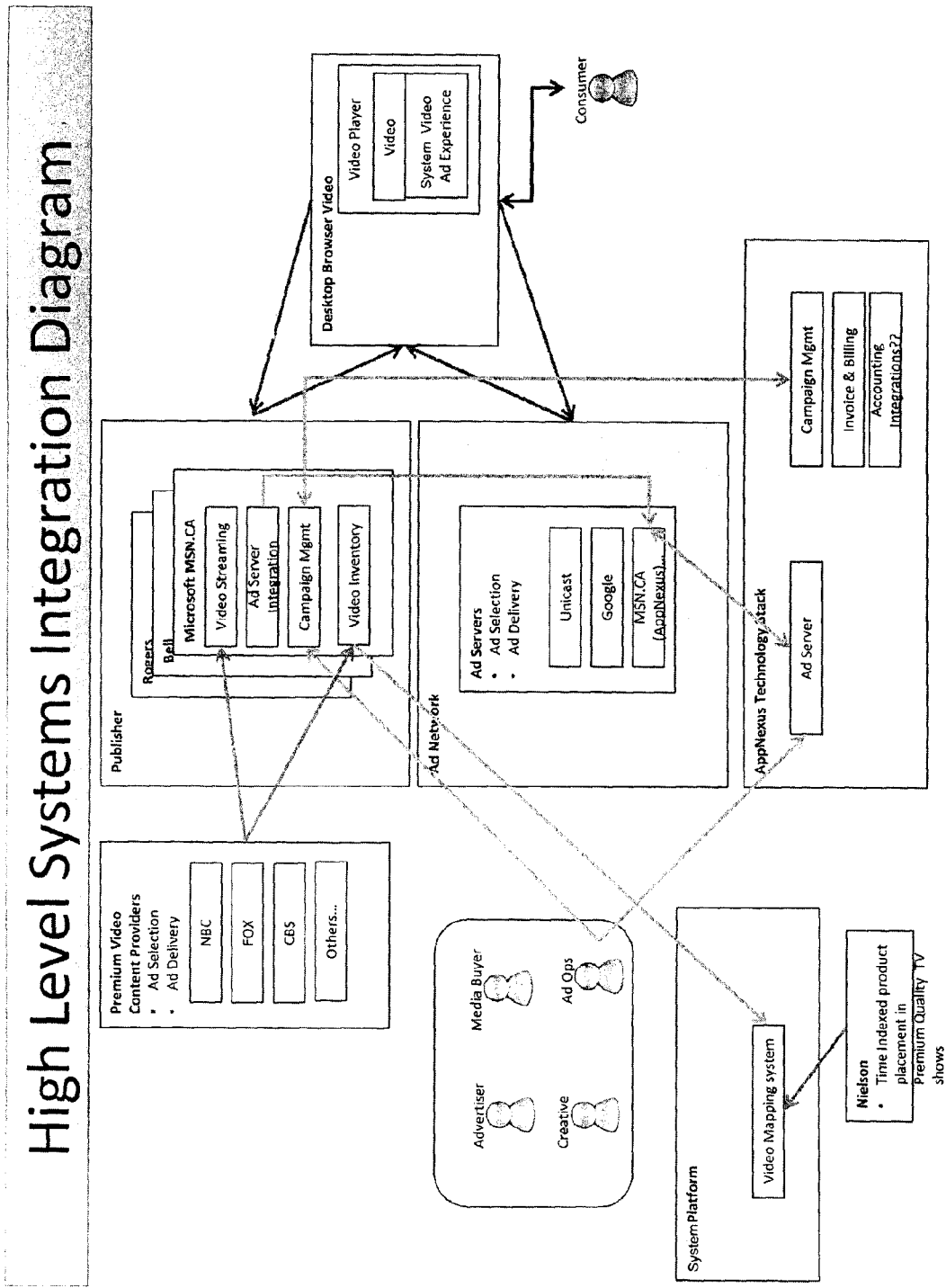
FIG. 8 is diagram showing example system integration in accordance with embodiments described herein.

As another example, FIG. 6 is diagram showing an example data flow in accordance with embodiments described herein. As an additional example, FIG. 7 is diagram showing an example campaign set up in accordance with embodiments described herein. As another further example, FIG. 8 is diagram showing example system integration in accordance with embodiments described herein. The details of which are similar to those described in relation to the other figures. FIGS. 6-8 use advertisements as an example of an electronic cue.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein.

The invention claimed is:

1. A method for providing one or more electronic cues for time-based media on a display of a client device, the method comprising:

assembling, using a processor, a first expandable electronic cue for display on the client device together with the time-based media, wherein the time-based media comprises a plurality of media frames, wherein each media frame is associated with a timecode corresponding to a playtime of the media frame at playback of the time-based media, wherein the first expandable electronic cue is associated with a first predetermined media timecode, wherein the first predetermined media timecode corresponds to a timecode associated with a media frame of the plurality of media frames for the time-based media;

wherein the assembling occurs prior to and in near real-time to the predetermined media timecode at playback of the media;

using a processor, determining a first display screen position for the first expandable electronic cue within a display frame of the media, wherein the first display screen position is based upon the first predetermined media timecode; and triggering, at the predetermined media timecode at playback of the media, the display of the first expandable electronic cue at the first display screen position in the media frame on the client device; and whereby said first expandable electronic cue expands and/or contracts in response to user interaction, and first expandable electronic cue comprises an icon portion and a flyout portion, whereby said flyout portion is configured to remain hidden until said user interaction is detected.

2. The method of claim 1, wherein the electronic cue comprises at least one of an advertisement, search box, auditory cue, and animation.

3. The method of claim 2, wherein the first expandable electronic cue comprises an advertisement, wherein the step of assembling further comprises:
  selecting the first expandable electronic cue from a sublisting of available advertisements, wherein each of the available advertisements in the sublisting corresponds to content referenced in the media, and wherein the first expandable electronic cue is associated with content referenced in the media at the first predetermined media timecode.

4. The method of claim 3, wherein the step of assembling further comprises:
  receiving a plurality of ad campaign specifications;
  receiving a listing of product placement information for the media, wherein the listing identifies a product placement and a corresponding media timecode;
  maintaining a listing of available advertisements;
  generating a sublisting of available advertisements by matching the listing of product placement information to the listing of available advertisements and filtering based on the ad campaign specifications;
  selecting the first expandable electronic cue from the sublisting of available advertisements, wherein the first expandable electronic cue is associated with the product placement, wherein each of the available advertisements in the sublisting corresponds to content referenced in the media, and wherein the first expandable electronic cue is associated with content referenced in the media at the first predetermined media timecode; and
  setting the first predetermined media timecode to be the corresponding media timecode of the product placement.

5. The method of claim 1, wherein the electronic cue provides a signal to prompt user attention when displayed at the first display position.

6. The method of claim 5, wherein the step of assembling further comprises:
  receiving a plurality of campaign specifications;
  receiving a listing of content items for the media, wherein the listing identifies a content item and a corresponding media timecode, wherein each content item corresponds to content referenced in the media at the media timecode;
  maintaining a listing of available electronic cues;
  generating the sublisting of available electronic cues by matching the listing of content items to the listing of available electronic cues and filtering based on the ad campaign specifications; and
  setting the first predetermined media timecode to be the corresponding media timecode of the content item placement.

7. The method of claim 1, wherein the step of assembling further comprises:
  selecting the first expandable electronic cue from a sublisting of available electronic cues, wherein each of the available electronic cues in the sublisting corresponds to content referenced in the media, and wherein the first expandable electronic cue is associated with content referenced in the media at the first predetermined media timecode.

8. The method of claim 1 further comprising hiding the fly-out portion after a discontinuation of the user interaction is detected.

9. The method of claim 1 further comprising detecting a user interaction and recording, in a memory, the detected user interaction in association with the first expandable electronic cue.

10. The method of claim 1 further comprising:
  determining a position grid corresponding to a display of a timeline for the media, the position grid comprising a plurality of timeline positions corresponding to a plurality of video timecodes in the playback of the media; and
  determining the first display screen position for the first expandable electronic cue relative to the media based upon a timeline position of the plurality of timeline positions, wherein the first display screen position overlaps the timeline position.

11. The method of claims 1, 2, 5-9, 10 wherein a display size of the first expandable electronic cue is in the range of about 1% and 10% of a display size of the media.

12. The method of claim 1 further comprising:
  assembling a second expandable electronic cue for display together with the media, wherein the second expandable electronic cue is associated with a second predetermined media timecode, wherein the second predetermined media timecode corresponds to a playtime of the media at playback;
  using the processor, determining a second display screen position for the second expandable electronic cue relative to the media based upon the second predetermined media timecode; and
  triggering display of the second expandable electronic cue at the second display screen position.

13. The method of claim 12 wherein the first predetermined media timecode is earlier than the second predetermined media timecode.

14. The method of claim 12 further comprising:
  displaying a timeline for the media, wherein the timeline comprises a plurality of timeline positions corresponding to a plurality of media timecodes for the media; and
  determining the first display screen position for the first expandable electronic cue relative to the media based upon a first timeline position corresponding to the first predetermined media timecode;
  determining the second display screen position for the second expandable electronic cuerelative to the media based upon a second timeline position corresponding to the second predetermined media timecode.

15. The method of claim 1 further comprising receiving a plurality of user interactions corresponding to a plurality of users; recording, in memory, interaction metrics based on the plurality of user interactions; and assembling the first expandable electronic cue based on the interaction metrics.

16. The method of claim 15 further comprising receiving user demographics, and assembling the first expandable electronic cue by matching the user demographics to the interaction metrics.

17. The method of claim 16 wherein the user demographics comprise location data and historical behaviour data.

18. The method of claim 1 wherein the step of determining the first display screen position for the first expandable electronic cue is based on the first predetermined media timecode and a playtime of the media.

19. A computing system for providing electronic cue for time-based media comprising a processor coupled to a computer readable memory comprising computer executable instructions that when executed by the processor cause the processor to:
- assemble a first expandable electronic cue for display on a client device together with the time-based media, wherein the time-based media comprises a plurality of media frames, wherein each media frame is associated with a timecode corresponding to a playtime of the media frame at playback of the timebased media, wherein the first expandable electronic cue is associated with a first predetermined media timecode, wherein the first predetermined media timecode corresponds to a timecode associated with a media frame of the plurality of media frames for the time-based media; wherein processor assembly occurs prior to and in near real-time to the predetermined media timecode at playback of the media;
- determine a first display screen position for the first expandable electronic cue within a display frame of the media, wherein the first display screen position is based upon the first predetermined media timecode; and
- trigger, at the predetermined media timecode at playback of the media, display of the first expandable electronic cue at the first display screen position in the media frame on the client device; and
- wherein said first expandable electronic cue expands and/or contracts in response to user interaction, and first expandable electronic cue comprises an icon portion and a flyout portion, whereby said flyout portion is configured to remain hidden until said user interaction is detected.

20. A client computing system comprising a processor coupled to a computer readable memory comprising computer executable instructions that when executed by the processor cause the processor to:
- receive a first expandable electronic cue for display together with time-based media, wherein the timebased media comprises a plurality of media frames, wherein each media frame is associated with a timecode corresponding to a playtime of the media frame at playback of the time-based media, wherein
- the first expandable electronic cue is associated with a first predetermined media timecode, wherein the first predetermined media timecode corresponds to a time code associated with a media frame of the plurality of media frames for the time-based media;
- receive a first display screen position for the first expandable electronic cue within a display frame of the media, wherein the first display screen position is based upon the first predetermined media timecode;
- display the first expandable electronic cue together with the video at the first predetermined media timecode, wherein the first expandable electronic cue is displayed at the first display screen position; and collect and transmit user demographic and behaviour data based on the first expandable electronic cue; and
- wherein said first expandable electronic cue expands and/or contracts in response to user interaction, and first expandable electronic cue comprises an icon portion and a flyout portion, whereby said flyout portion is configured to remain hidden until said user interaction is detected.

* * * * *